US 8,452,566 B2

(12) United States Patent
Goodnow et al.

(10) Patent No.: US 8,452,566 B2
(45) Date of Patent: May 28, 2013

(54) WARRANTY MONITORING AND ENFORCEMENT FOR INTEGRATED CIRCUIT AND RELATED DESIGN STRUCTURE

(75) Inventors: Kenneth J. Goodnow, Essex Junction, VT (US); Suzanne Granato, Essex Junction, VT (US); Eze Kamanu, Essex Junction, VT (US); Todd E. Leonard, Williston, VT (US); Ramnath Ravindran, Burlington, VT (US); Kyle E. Schneider, Bristol, VT (US); Peter A. Twombly, Shelburne, VT (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 12/113,974

(22) Filed: May 2, 2008

(65) Prior Publication Data

US 2009/0276178 A1    Nov. 5, 2009

(51) Int. Cl.
   *G06F 3/00*    (2006.01)
   *G06F 3/01*    (2006.01)
   *G06F 3/023*   (2006.01)
   *G06F 3/03*    (2006.01)

(52) U.S. Cl.
   USPC ............ 702/117; 702/120; 702/121; 702/123

(58) Field of Classification Search
   USPC ............... 702/65, 81, 83, 106, 117, 130, 178, 702/179, 182, 183; 206/710; 705/1
   See application file for complete search history.

(56) References Cited

U.S. PATENT DOCUMENTS

| 5,606,511 | A | 2/1997 | Yach |
| 6,154,675 | A * | 11/2000 | Juran et al. ...................... 607/29 |
| 6,172,428 | B1 | 1/2001 | Jordan |
| 6,449,577 | B1 * | 9/2002 | Timpe .......................... 702/118 |
| 6,594,597 | B1 | 7/2003 | Schoch |
| 6,820,039 | B2 * | 11/2004 | Johnson et al. ............... 702/184 |
| 6,904,592 | B1 | 6/2005 | Johnson |
| 7,373,307 | B2 * | 5/2008 | Merkin et al. .................... 705/4 |
| 7,578,392 | B2 * | 8/2009 | Brooks et al. ................ 206/710 |
| 2002/0133425 | A1 | 9/2002 | Pederson et al. |
| 2004/0030574 | A1 | 2/2004 | DiCostanzo et al. |
| 2006/0184379 | A1 | 8/2006 | Tan et al. |
| 2006/0238388 | A1 | 10/2006 | Jayanth |
| 2007/0174075 | A1 * | 7/2007 | Franke et al. ..................... 705/1 |

(Continued)

FOREIGN PATENT DOCUMENTS

JP    2001144243    5/2001

OTHER PUBLICATIONS

U.S. Appl. No. 12/113,966, filed May, 2, 2008, Final Office Action dated May 14, 2010.

(Continued)

*Primary Examiner* — Eliseo Ramos Feliciano
*Assistant Examiner* — Felix Suarez
(74) *Attorney, Agent, or Firm* — David A. Cain; Hoffman Warnick LLC (57) ABSTRACT

An integrated circuit (IC) including a warranty and enforcement system, and a related design structure and HDL design structure are disclosed. In one embodiment, an IC includes a parameter obtainer for obtaining a value of a parameter of the IC; a warranty data storage system for storing warranty limit data regarding the IC; a comparator for determining whether a warranty limit has been exceeded by comparing the value of the parameter to a corresponding warranty limit; and an action taker for taking a prescribed action in response to the warranty limit being exceeded.

13 Claims, 4 Drawing Sheets

U.S. PATENT DOCUMENTS

| | | |
|---|---|---|
| 2008/0100467 A1 | 5/2008 | Downie et al. |
| 2008/0144341 A1 | 6/2008 | Cook |
| 2008/0174329 A1 | 7/2008 | Papageorgiou et al. |
| 2008/0195413 A1* | 8/2008 | Franke et al. .................... 705/1 |
| 2008/0243530 A1 | 10/2008 | Stubler |

OTHER PUBLICATIONS

U.S. Appl. No. 12/113,966, filed May 2, 2008, Amendment to Office Action dated Jan. 4, 2010, filed Mar. 30, 2010.

U.S. Appl. No. 12/113,966, filed May 2, 2008, Office Action dated Jan. 4, 2010.

Sittner, Office Action Communication for U.S. Appl. No. 12/113,966 dated Mar. 14, 2011, 36 pages.

U.S. Appl. No. 12/113,966, filed May 2, 2008, Final Office Action dated Jul. 21, 2011.

\* cited by examiner

WARRANTY MONITORING AND ENFORCEMENT FOR INTEGRATED CIRCUIT AND RELATED DESIGN STRUCTURE

CROSS REFERENCE TO RELATED APPLICATIONS

This U.S. Patent Application is related to pending U.S. patent application Ser. No. 12/113,966, filed concurrently herewith on May 2, 2008.

BACKGROUND

1. Technical Field

The disclosure relates generally to integrated circuit (IC) operation, and more particularly, to warranty monitoring and enforcement for an IC including a design structure for the IC.

2. Background Art

Practically all products made have some sort of warranty associated therewith. Typically, most warranties have limits prescribed by the manufacturer after which the warranty is unenforceable or changed. In the integrated circuit (IC) industry, warranty limits are generally based upon a date of purchase or whether the IC is used outside of specified, acceptable operational parameters. IC warranty limits may include, for example, power-on hours, temperature limits, voltage limits, or any environmental or usage parameters. With ICs, other than the date of purchase and the rare occurrence where an end-user knows the parameters under which an IC operates, operational data regarding the IC is typically unavailable. Consequently, enforcement of warranty limits for ICs is difficult. Furthermore, in most cases, the end-user is not aware of the status of warranty limiting parameters of the IC, and cannot avoid warranty limiting events.

SUMMARY

An integrated circuit (IC) including a warranty and enforcement system, a method and related design structure are disclosed. In one embodiment, an IC includes a parameter obtainer for obtaining a value of a parameter of the IC; a warranty data storage system for storing warranty limit data regarding the IC; a comparator for determining whether a warranty limit has been exceeded by comparing the value of the parameter to a corresponding warranty limit; and an action taker for taking a prescribed action in response to the warranty limit being exceeded.

A first aspect of the disclosure provides an integrated circuit (IC) comprising: a parameter obtainer for obtaining a value of a parameter of the IC; a warranty data storage system for storing warranty limit data regarding the IC; a comparator for determining whether a warranty limit has been exceeded by comparing the value of the parameter to a corresponding warranty limit; and an action taker for taking a prescribed action in response to the warranty limit being exceeded.

A second aspect of the disclosure provides a method comprising: storing warranty limit data regarding an integrated circuit (IC); obtaining a value of a parameter of the IC; determining whether a warranty limit has been exceeded by comparing the value of the parameter to a corresponding warranty limit; and taking a prescribed action in response to the warranty limit being exceeded.

A third aspect of the disclosure provides a design structure embodied in a machine readable medium for designing, manufacturing, or testing an integrated circuit, the design structure comprising: an integrated circuit (IC) including: a warranty data storage system for storing warranty limit data regarding the IC; a parameter obtainer for obtaining a value of a parameter of the IC; a comparator for determining whether a warranty limit has been exceeded by comparing the value of the parameter to a corresponding warranty limit; and an action taker for taking a prescribed action in response to the warranty limit being exceeded.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
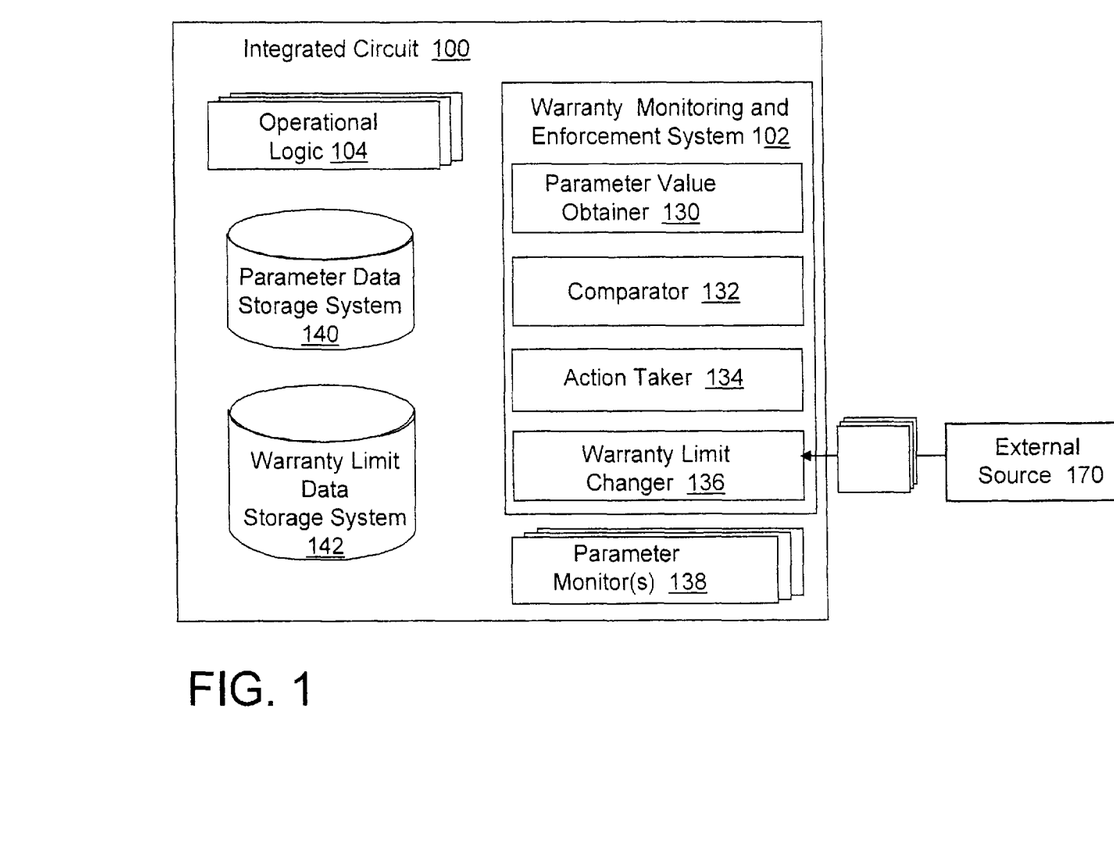
FIG. 1 shows embodiments of an integrated circuit (IC) including a warranty and enforcement system according to the disclosure.

Referring to FIG. 1, embodiments of an integrated circuit (IC) 100 including a warranty monitoring and enforcement system 102 according to the disclosure are shown. "Integrated circuit" (IC) as used herein may include, but is not limited to: any miniaturized circuitry, and may include, for example, one or more application specific or general-purpose circuits or systems. That is, IC should be given the broadest possible interpretation. IC 100 includes operational logic 104 that may perform any now known or later developed functions outside of warranty monitoring and enforcement system 102. A "warranty" as used herein is a promise that the material and workmanship of IC 100 is without defect or will meet a specified level of performance over a specified period of time when used in a manner consistent with that prescribed. A "warranty limit" is a value of one or more parameters of IC 100 at which some change in the warranty occurs. For example, upon the temperature of IC 100 exceeding 80° C., the warranty may stipulate that it is void. Hence, a temperature of 80° C. is a warranty limit. The warranty limit may also be predicated on a number of parameters. For example, power on hours exceeding 40,000 and a voltage exceeding 1.5 V may be combined to represent a warranty limit.

Warranty monitoring and enforcement system 102 (hereinafter "warranty system 102") includes a parameter obtainer 130, a comparator 132, an action taker 134 and a warranty limit changer 136. Warranty system 102 may include, or access, one or more parameter monitor(s) 138. In addition, warranty system 102 may include a parameter data storage system 140 and a warranty limit data storage system 142. Each storage system 140, 142 may include, for example, any type of non-volatile memory such as non-volatile memory random access memory (NV-RAM), which may be positioned on IC 100 (as shown) or external thereto. Each of the above-described components will be described in greater detail herein.

Figure 2:
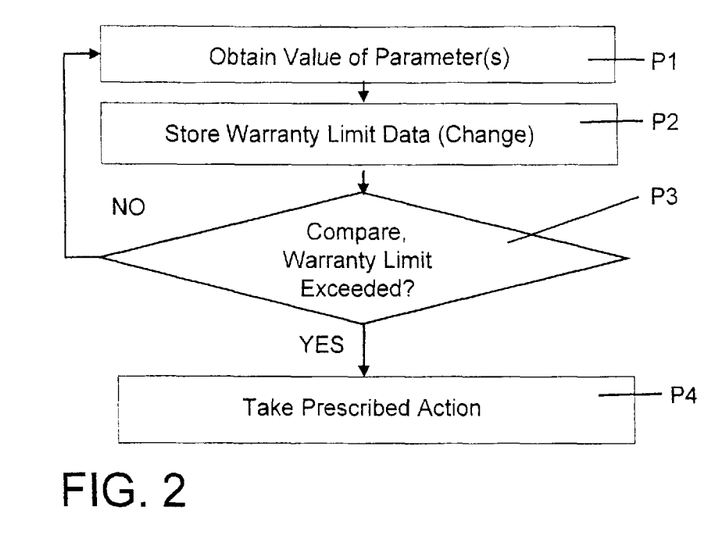
FIG. 2 shows a flow diagram of embodiments of an operational methodology of the warranty and enforcement system of FIG. 1.
Figure 3:
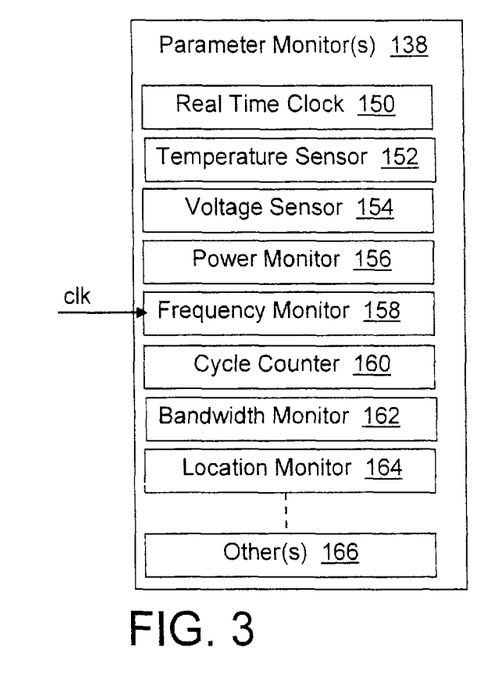
FIG. 3 shows embodiments of parameter monitor(s) according to the disclosure.

Turning to FIG. 2, a flow diagram showing embodiments of an operational methodology of warranty system 102 is illustrated. In a first process P1, parameter obtainer 130 obtains a value of a parameter of IC 100. A "parameter" may be any characteristic of IC 100 that impacts a warranty. For example, a parameter of IC 100 may include, but is not limited to: power-on hours, temperature, clock frequency, location (e.g., determined by a global positioning system (GPS), data communication volume over one or more interfaces, etc. A parameter value may be obtained in a number of ways. In one embodiment, parameter obtainer 130 may directly access a parameter monitor 138 that monitors/senses a value of the particular parameter. For example, FIG. 3 shows embodiments of a parameter monitor(s) 138 including, but not limited to: a real time clock 150, a temperature sensor 152, a voltage sensor 154, a power monitor 156, a frequency monitor 158 (receives a clock (clk) signal), a cycle counter 160, a bandwidth monitor 162, a location monitor 164 (e.g., GPS), and perhaps other monitors 166. Each parameter monitor 138 may include any now known or later developed structure necessary for monitoring/sensing that stated parameter. Since these monitors are known, no further description is deemed necessary. Although each parameter monitor 138 is shown once, it is understood that one or more of the parameter monitors 138 may be repeated multiple times and at different locations within IC 100.

In an alternative embodiment, a parameter value may be obtained by parameter obtainer 130 from parameter data stored in parameter data storage system 140. In this case, parameter monitor(s) 138 may periodically update a value of a parameter in parameter data storage system 140 for later access by parameter obtainer 130. In some instances, a history of a parameter is required and periodic updating by an associated parameter monitor 138 allows for partial sum updates or other calculations or analysis of rough data. Illustrative parameters that may require period updating include, but are not limited to: power on time, number of cycles and total bandwidth.

In process P2, warranty data storage system 142 stores warranty limit data regarding the IC. Warranty limit data may include a plurality of warranty limits that can be compared to value(s) of one or more parameters to determine whether the warranty limit has been exceeded. A warranty limit may be generated in a number of ways. In one embodiment, a warranty limit may be generated when IC 100 is created by the manufacturer, i.e., set by the IC manufacturer. In another embodiment, warranty limit changer 136 dynamically changes the warranty limit based on at least one parameter of the IC. In this case, a warranty limit may be generated when IC 100 is created by the manufacturer and dynamically changed. For example, warranty limit changer 136 may extend the expiration date of a warranty provision when a power on time parameter is less than expected, or if temperature or voltage does not exceed some predetermined value. In another embodiment, a warranty limit may be generated via a source 170 external to IC 100 via a network such as the Internet. External source 170 may be any entity such as the IC manufacturer that is allowed to change a warranty limit.

In process P3, comparator 132 determines whether a warranty limit has been exceeded by comparing the value of the parameter to a corresponding warranty limit. For example, a temperature of 98° C. compared to a warranty limit of 80° C. results in an indication that that warranty limit is exceeded. It is understood that a one-to-one correspondence between a value of a parameter and a warranty limit is not necessary and that combinations of values of parameters may be required. Hence, "corresponding warranty limit" may include a number of warranty limits or may require a number of parameter values in order to be comparatively analyzed.

In process P4, action taker 134 takes a prescribed action in response to the warranty limit being exceeded. The prescribed action may take any form necessary for enforcing warranty provisions, and may be stored as part of warranty limit data in warranty limit data storage system 142. In one embodiment, the prescribed action may include disabling at least a part of the IC, i.e., a part of operational logic 104. In another embodiment, the prescribed action may include providing a notification to a user of IC 100, e.g., via an output device coupled to IC 100, that a warranty provision is about to be violated so that the user can take appropriate action. For example, where an IC is constructed for cold weather operation only and the IC 100 is about to pass to a warmer latitude, a warning may be presented to a user. In another embodiment, the prescribed action may include re-enabling at least a part of IC 100 that has been disabled by a previous prescribed action. For example, carrying on with the above location example, where IC 100 moves back to the appropriate latitude, the part of IC 100 disabled may be re-enabled. In another embodiment, the prescribed action may include conducting a repair such as replacing a broken part of operational logic 104 with a redundant part thereof. The above-described prescribed actions are only illustrative, and other actions may be possible within the scope of the disclosure.

As is known in the art, in general, IC 100 executes computer program code, such as warranty system 102, embodied as firmware that is stored in memory therein and/or storage systems 140 and/or 142. While executing computer program code, IC 100 can read and/or write data, such as parameter values, to/from memory, storage systems 140, 142, and/or I/O interfaces (not shown). A communications link with IC 100 may employ any form of internal network or an external network. In the latter case, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Warranty system 102 may take the form of an entirely hardware embodiment, an entirely software embodiment or an embodiment containing both hardware and software elements. In a preferred embodiment, the disclosure is implemented in software, which includes but is not limited to firmware, resident software, microcode, etc. In one embodiment, the disclosure can take the form of a computer program product accessible from a computer-usable or computer-readable medium providing program code for use by or in connection with a computer or any instruction execution system, which when executed, enables a computer infrastructure to provide warranty system 102. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, such as storage system 140, magnetic tape, a removable computer diskette, a random access memory (RAM), a read-only memory (ROM), a tape, a rigid magnetic disk and an optical disk. Current examples of optical disks include compact disk-read only memory (CD-ROM), compact disk-read/write (CD-R/W) and DVD.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

Figure 4:
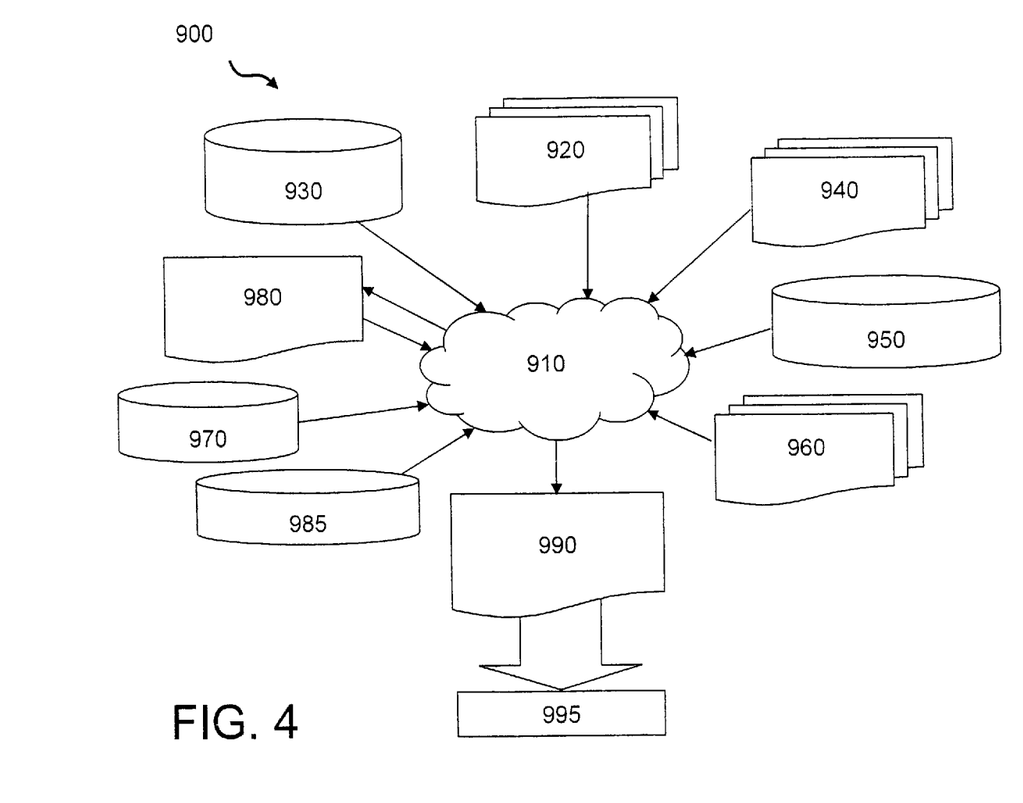
FIG. 4 shows a flow diagram of a design process used in semiconductor design, manufacture, and/or test.

FIG. 4 shows a block diagram of an exemplary design flow 900 used for example, in semiconductor design, manufacturing, and/or test. Design flow 900 may vary depending on the type of IC being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 comprises an embodiment of the disclosure as shown in FIGS. 1 and 3 in the form of schematics or HDL, a hardware-description language (e.g., Verilog, VHDL, C, etc.). Design structure 920 may be contained on one or more machine readable medium. For example, design structure 920 may be a text file or a graphical representation of an embodiment of the disclosure as shown in FIGS. 1 and 3. Design process 910 preferably synthesizes (or translates) an embodiment of the disclosure as shown in FIGS. 1 and 3 into a netlist 980, where netlist 980 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a programmable gate array (PGA) or a field programmable gate array (FPGA) offered by Altera® Inc. or Xilinx® Inc, a packet of data to be sent via the Internet, or other networking suitable means. The synthesis may be an iterative process in which netlist 980 is resynthesized one or more times depending on design specifications and parameters for the circuit.

FIG. 9 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in an embodiment of the disclosure as shown in FIGS. 1 and 3. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in an embodiment of the disclosure as shown in FIGS. 1 and 3 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990. Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in an embodiment of the disclosure as shown in FIGS. 1 and 3. In one embodiment, design structure 990 may comprise a compiled, executable HDL simulation model that functionally simulates the devices shown in FIGS. 1 and 3.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in an embodiment of the disclosure as shown in FIGS. 1 and 3. Design structure 990 may then proceed to a stage 995 where, for example, design structure 990: proceeds to tape-out, is released to manufacturing, is released to a mask house, is sent to another design house, is sent back to the customer, etc.

As discussed herein, various systems and components are described as "obtaining" data (e.g., parameter obtainer 130, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing flow diagrams show some of the processing functions associated with warranty monitoring and enforcement according to several embodiments of this disclosure. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

The IC, warranty system, design structure and method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments chosen and described were made in order to best explain the principles of the disclosure and the practical application, and to enable others of ordinary skill in the art to understand the disclosure for various embodiments with various modifications as are suited to the particular use contemplated.

What is claimed is:

1. An integrated circuit (IC) comprising:
 a parameter obtainer for obtaining a value of a parameter of the IC;
 a warranty data storage system for storing warranty limit data regarding the IC;
 a comparator for determining whether a warranty limit of the IC has been exceeded by comparing the value of the parameter of the IC to a corresponding warranty limit for the parameter of the IC;
 extending a warranty time limit of the IC in response to determining that the value of the parameter of the IC does not exceed a predetermined threshold; and
 an action taker for taking a prescribed action in response to the warranty limit of the IC being exceeded, wherein the prescribed action includes disabling at least a part of the IC.

2. The IC of claim 1, further comprising a parameter data storage system for storing the value of the parameter of the IC as parameter data.

3. The IC of claim 1, wherein the prescribed action includes re-enabling at least a part of the IC that has been disabled by a previous prescribed action.

4. The IC of claim 1, wherein the extending of the warranty time limit of the IC comprises extending the warranty time limit based on an input from a source external to the IC.

5. The IC of claim 1, wherein the parameter of the IC is selected from the group consisting of: power-on hours, temperature, clock frequency, location, and data communication volume over one or more interfaces.

6. A design structure embodied in a non-transitory machine readable medium, which when executed by a computer system is used for designing, manufacturing, or testing an integrated circuit, the design structure comprising:
   an integrated circuit (IC) including:
   a warranty data storage system for storing warranty limit data regarding the IC;
   a parameter obtainer for obtaining a value of a parameter of the IC;
   a comparator for determining whether a warranty limit of the IC has been exceeded by comparing the value of the parameter of the IC to a corresponding warranty limit for the parameter of the IC;
   extending a warranty time limit of the IC in response to determining that the value of the parameter of the IC does not exceed a predetermined threshold; and
   an action taker for taking a prescribed action in response to the warranty limit of the IC being exceeded, wherein the prescribed action is selected from the group consisting of: disabling at least a part of the IC, and re-enabling at least a part of the IC that has been disabled by a previous prescribed action.

7. The design structure of claim 6, wherein the design structure comprises a netlist.

8. The design structure of claim 6, wherein the design structure resides on storage medium as a data format used for the exchange of layout data of integrated circuits.

9. The design structure of claim 6, wherein the design structure resides in a programmable gate array.

10. A hardware description language (HDL) design structure encoded on a non-transitory machine-readable data medium that when processed in a computer-aided design system generates a machine-executable representation of an integrated circuit (IC) comprising:
    a parameter obtainer for obtaining a value of a parameter of the IC;
    a warranty data storage system for storing warranty limit data regarding the IC;
    a comparator for determining whether a warranty limit of the IC has been exceeded by comparing the value of the parameter of the IC to a corresponding warranty limit for the parameter of the IC;
    extending a warranty time limit of the IC in response to determining that the value of the parameter of the IC does not exceed a predetermined threshold; and
    an action taker for taking a prescribed action in response to the warranty limit of the IC being exceeded, wherein the prescribed action is selected from the group consisting of: disabling at least a part of the IC, and re-enabling at least a part of the IC that has been disabled by a previous prescribed action.

11. The HDL design structure of claim 10, wherein the design structure comprises a netlist.

12. The HDL design structure of claim 10, wherein the design structure resides on storage medium as a data format used for the exchange of layout data of integrated circuits.

13. The design structure of claim 10, wherein the design structure resides in a programmable gate array.

\* \* \* \* \*